US010592584B2

(12) United States Patent
Ko et al.

(10) Patent No.: US 10,592,584 B2
(45) Date of Patent: Mar. 17, 2020

(54) INFORMATION PROCESSING APPARATUS, INFORMATION PROCESSING METHOD, AND PROGRAM

(71) Applicant: Kabushiki Kaisha Toshiba, Tokyo (JP)

(72) Inventors: Myungsook Ko, Tokyo (JP); Eiichi Sunagawa, Tokyo (JP); Ken Ueno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 499 days.

(21) Appl. No.: 15/267,766

(22) Filed: Sep. 16, 2016

(65) Prior Publication Data

US 2017/0270075 A1    Sep. 21, 2017

(30) Foreign Application Priority Data

Mar. 17, 2016   (JP) ................................ 2016-054222

(51) Int. Cl.
*G06F 17/18* (2006.01)
*G06F 17/15* (2006.01)

(52) U.S. Cl.
CPC .............. *G06F 17/18* (2013.01); *G06F 17/15* (2013.01)

(58) Field of Classification Search
None
See application file for complete search history.

(56) References Cited

U.S. PATENT DOCUMENTS

| 8,706,671 B2 | 4/2014 | Yano |
| 2006/0276994 A1 | 12/2006 | Tsuda et al. |
| 2017/0116530 A1* | 4/2017 | Modarresi ............... G06F 17/18 |

FOREIGN PATENT DOCUMENTS

| JP | 5-6394 | 1/1993 |
| JP | 2002-358411 | 12/2002 |
| JP | 2006-252011 | 9/2006 |
| JP | 2010-282547 | 12/2010 |
| JP | 4839416 | 12/2011 |
| JP | 5085016 | 11/2012 |
| JP | 2016-114987 | 6/2016 |

* cited by examiner

*Primary Examiner* — Bijan Mapar
(74) *Attorney, Agent, or Firm* — Finnegan, Henderson, Farabow, Garrett & Dunner, L.L.P.

(57) ABSTRACT

An information processing apparatus has a model construction unit that constructs a model represented using a plurality of variables corresponding to a plurality of classes, an evaluated value calculation unit that calculates an evaluated value of the model constructed by the model construction unit, a correlation specification unit that specifies a correlation between some variables among the plurality of variables based on the calculated evaluated value, a variable processing determination unit that determines whether to perform at least one of creation, integration, and stratification of at least some variables among the plurality of variables based on the correlation specified by the correlation specification unit, and a variable processing unit that performs at least one of creation processing, integration processing, and stratification processing of the variables when the at least one of the creation, the integration, and the stratification of the variables is determined to be performed.

20 Claims, 10 Drawing Sheets

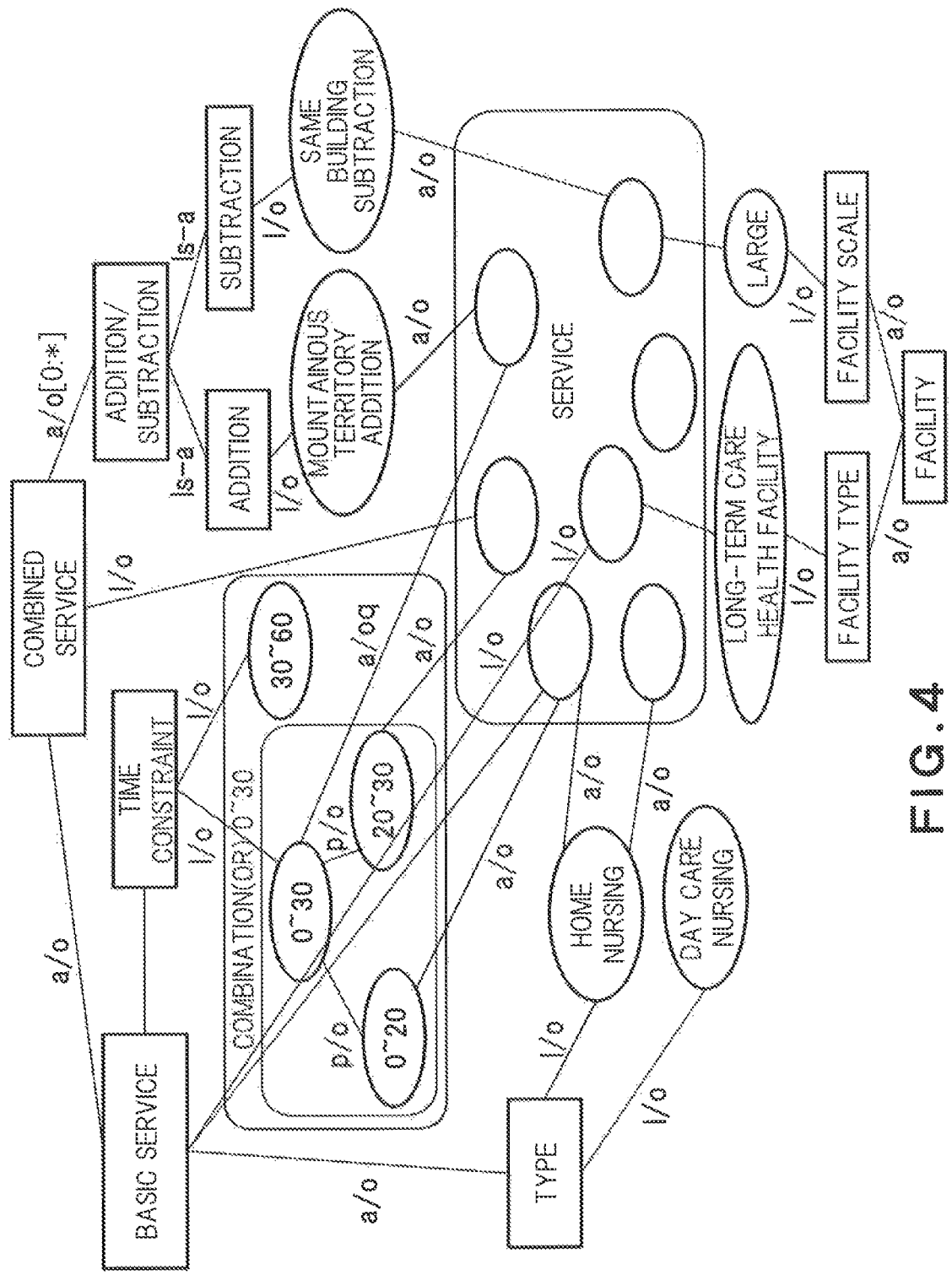
F I G. 4

WHEN A AND B ARE ADJACENT TO EACH OTHER

| VARIABLE | LINK → | VARIABLE | PROCESSING |
|---|---|---|---|
| A | instance-of | B | INTEGRATION INTO B |
| A | attribute-of | B | INTEGRATION INTO A |
| A | part-of | B | INTEGRATION INTO B |

FIG.10A

WHEN A AND B ARE NOT ADJACENT TO EACH OTHER

| VARIABLE | LINK → | CONNECTION OBJECT OF VARIABLE | PROCESSING |
|---|---|---|---|
| A<br>B | instance-of<br>instance-of | C<br>C | STRATIFICATION WHEN C CAN TAKE ONLY ONE OF A AND B, AND CREATION, OTHERWISE |
| A<br>B | instance-of<br>attribute-of | C<br>C | CREATION(A·B) |
| A<br>B | attribute-of<br>attribute-of | C<br>C | CREATION(A·B) |
| A<br>B | part-of<br>part-of | C<br>C | INTEGRATION INTO C |
|  | NO LINK |  | STRATIFY A AND B |

FIG.10B

INFORMATION PROCESSING APPARATUS, INFORMATION PROCESSING METHOD, AND PROGRAM

CROSS REFERENCE TO RELATED APPLICATIONS

This application is based upon and claims the benefit of priority from the prior Japanese Patent Application No. 2016-54222, filed on Mar. 17, 2016, the entire contents of which are incorporated herein by reference.

FIELD

An embodiment relates to an information processing apparatus, an information processing method, and a program.

BACKGROUND

When a statistical model is constructed, and variables are correlative to each other in a regression model, a stable model may not be constructed, which is referred to as multicollinearity. Stratification of data is considered as a scheme of solving multicollinearity.

When stratification is minutely performed, accuracy is improved, and multicollinearity can be solved. However, there are problems that the number of included samples decreases, and a reliable statistical model cannot be constructed.

BRIEF DESCRIPTION OF THE DRAWINGS

FIG. 4 is a diagram illustrating an example of combining variables in a condition of "or";

FIG. 10A is a diagram illustrating an example of variable processing information when variable A and variable B are adjacent to each other; and FIG. 10B is a diagram illustrating an example of the variable processing information when variable A and variable B are not adjacent to each other.

DETAILED DESCRIPTION

According to one embodiment, an information processing apparatus has:

a model construction unit that constructs a model represented using a plurality of variables corresponding to a plurality of classes based on data of a concept network defining the plurality of classes, attributes of the classes, and a relationship between the classes;

an evaluated value calculation unit that calculates an evaluated value of the model constructed by the model construction unit;

a correlation specification unit that specifies a correlation between some variables among the plurality of variables based on the evaluated value calculated by the evaluated value calculation unit;

a variable processing determination unit that determines whether to perform at least one of creation, integration, and stratification of at least some variables among the plurality of variables based on the correlation specified by the correlation specification unit; and a variable processing unit that performs at least one of creation processing, integration processing, and stratification processing of the variables when the at least one of the creation, the integration, and the stratification of the variables is determined to be performed by the variable processing determination unit, wherein the model construction unit constructs a new model after the at least one of the creation processing, the integration processing, and the stratification processing is performed.

Figure 1:
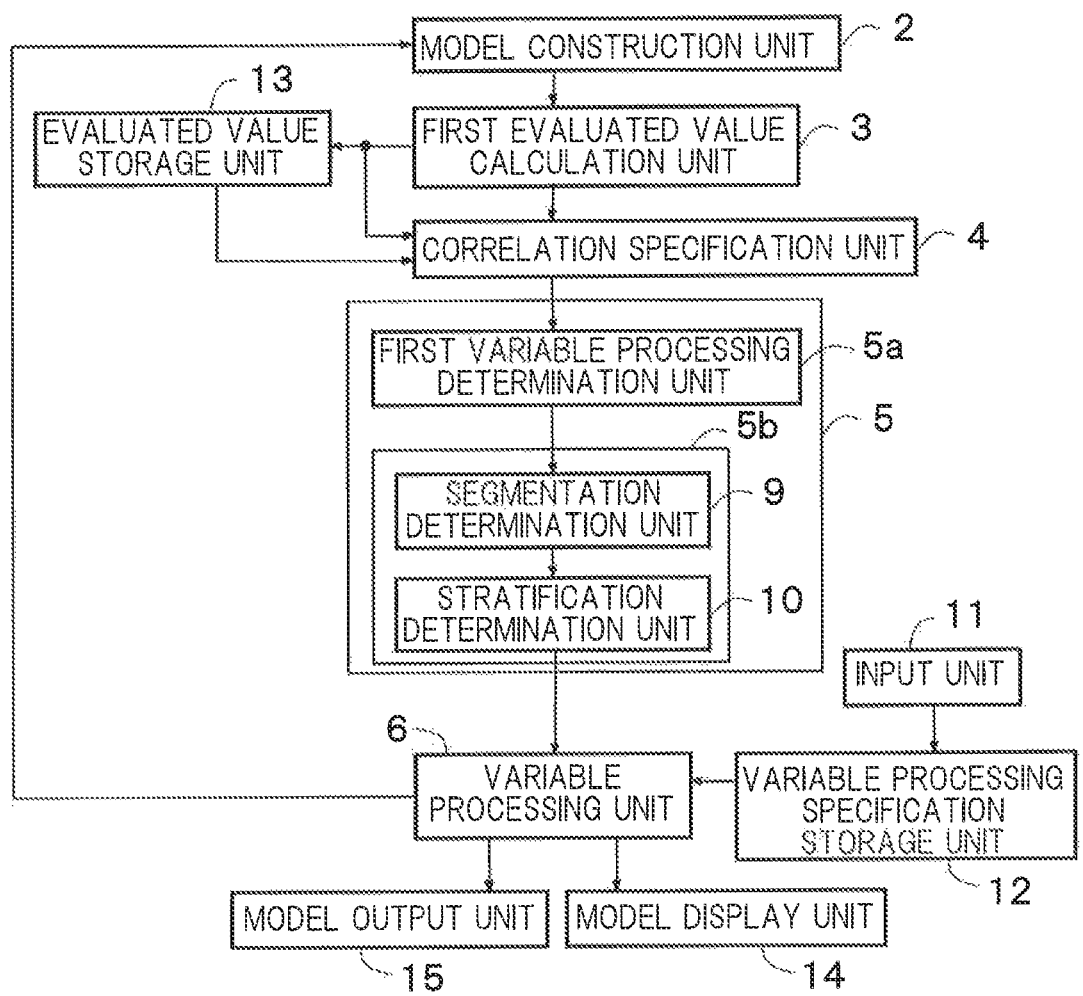
FIG. 1 is a block diagram illustrating a schematic configuration of an information processing apparatus 1 according to an embodiment.

Hereinafter, an embodiment will be described with reference to drawings. FIG. 1 is a block diagram illustrating a schematic configuration of an information processing apparatus 1 according to an embodiment. The information processing apparatus 1 of FIG. 1 includes a model construction unit 2, an evaluated value calculation unit 3, a correlation specification unit 4, a variable processing determination unit 5, and a variable processing unit 6.

The model construction unit 2 constructs a model represented using a plurality of variables corresponding to a plurality of classes based on data of a concept network which defines the plurality of classes, attributes of the respective classes, and a relationship of the respective classes. The evaluated value calculation unit 3 calculates an evaluated value of the model constructed by the model construction unit 2. This evaluated value is a value obtained by digitizing a correlation between variables. The correlation specification unit 4 specifies a correlation between some variables among the plurality of variables based on the evaluated value calculated by the evaluated value calculation unit 3. The correlation specification unit 4 specifies a correlation between some variables among the plurality of variables based on a value of a correlation coefficient or a value P of hypothesis testing of independency.

The variable processing determination unit 5 determines whether to perform at least one of creation, integration, and stratification of at least some variables among the plurality of variables based on the correlation specified by the correlation specification unit. The variable processing determination unit 5 may include a first variable processing determination unit 5a and a second variable processing determination unit 5b. The first variable processing determination unit 5a determines whether to perform at least one of creation and integration of at least some variables among the plurality of variables based on the correlation specified by the correlation specification unit 4. The second variable processing determination unit 5b determines whether to perform stratification of at least some variables among the plurality of variables after determination processing of the first variable processing determination unit 5a.

The variable processing unit 6 performs at least one of variation creation processing, integration processing, and stratification processing when the at least one of the variation creation, the integration, and the stratification of the variables is determined to be performed by the variable processing determination unit 5. In a case in which the variable processing determination unit 5 includes the first variable processing determination unit 5a and the second variable processing determination unit 5b, the variable processing unit 6 performs variable creation processing when variable creation is determined to be performed by the first variable processing determination unit 5a, performs variation integration processing when variable integration is determined to be performed by the first variable processing determination unit 5a, and performs variable stratification processing when variation stratification is determined to be performed by the second variable processing determination unit 5b. The model construction unit 2 constructs a new model after performing at least one of creation processing, integration processing, and stratification processing.

More specifically, the variable processing determination unit 5 or the second variable processing determination unit 5b includes a segmentation determination unit 9 and a stratification determination unit 10. The segmentation determination unit 9 determines whether to segment variable granularity when a plurality of variables does not belong to the same class and does not have an inclusion relation. After the variable granularity is segmented, the stratification determination unit 10 determines whether to stratify at least some variables. The above-described variable processing unit 6 performs stratification processing of at least some variables when the plurality of variables does not belong to the same class and does not have the inclusion relation, and when stratification is determined to be performed by the stratification determination unit 10.

Furthermore, the information processing apparatus 1 of FIG. 1 may include an input unit 11, a variable processing specification storage unit 12, an evaluated value storage unit 13, a model display unit 14, and a model output unit 15. The input unit 11 inputs, by a user, variable processing specifications indicating whether to perform combination, integration, or stratification of a plurality of variables in the data of the concept network which defines the plurality of classes, the attributes of the respective classes, and the relationship of the respective classes. The variable processing specification storage unit 12 stores the variable processing specifications input from the input unit 11, and variable processing specifications corresponding to processing performed by the variable processing unit 6. The evaluated value storage unit 13 stores the evaluated value calculated by the evaluated value calculation unit 3, and an evaluated value calculated by the evaluated value storage unit 13. The model display unit 14 displays the model constructed by the model construction unit 2 or a model construction unit 7. A display form of the model is not particularly an issue. The model output unit 15 outputs data of the model constructed by the model construction unit 2 or the model construction unit 7. An output form of the data of the model is not particularly an issue. Examples of an output destination include a printer and a recording device that records data.

Figure 2:
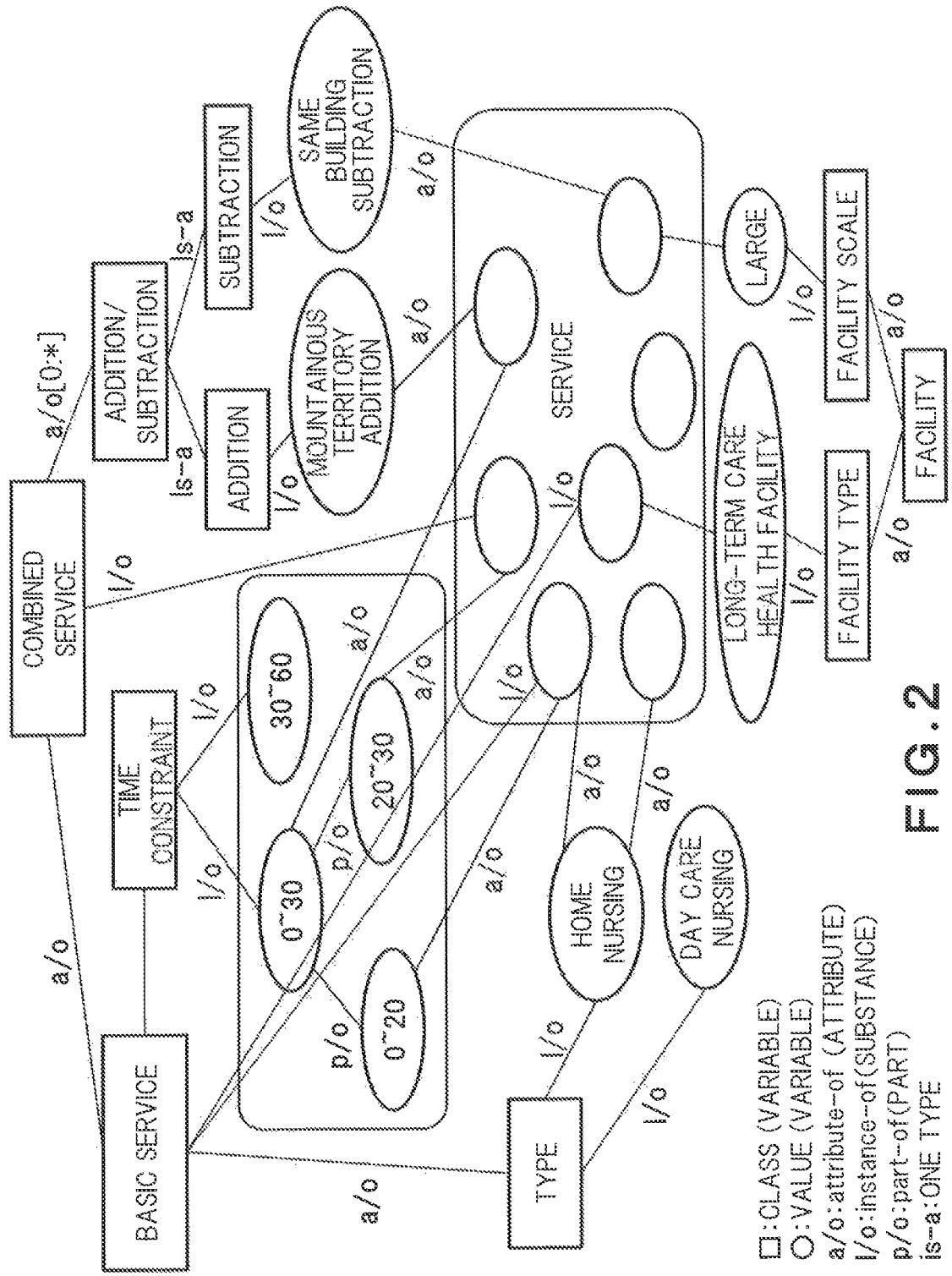
FIG. 2 is a diagram illustrating a concept hierarchy according to ontology.

FIG. 2 is a diagram illustrating a concept hierarchy according to ontology corresponding to an example of the data of the concept network which defines the plurality of classes, the attributes of the respective classes, and the relationship of the respective classes. The concept hierarchy according to ontology of FIG. 2 indicates a concept hierarchy based on a world view of a nursing service. This concept hierarchy includes a plurality of classes, attributes of the respective classes, and attribute values. In FIG. 2, a symbol □ indicates a class, and a symbol ○ indicates a value. A relationship between concept hierarchies is represented by "is-a", "attribute-of" (a/o), "part-of" (p/o), "instance-of" (I/o), and the like. A case in which [1;*] is present after a relationship indicates that a plurality of attributes are included. "is-a" indicates one type. For example, "is-a" is used to represent that a calico cat is a type of cat. "attribute-of" indicates an attribute. For example, "attribute-of" is used to represent that an apple has a color attribute. "part-of" is used to represent a portion or a part. "instance-of" is used to represent a substance (instance).

In addition, in FIG. 2, both a class represented by □ and a value represented by ○ are variables. That is, each variable in the concept hierarchy according to ontology is an attribute that represents a characteristic of an object, and a value of each variable is an attribute value.

Figure 3:
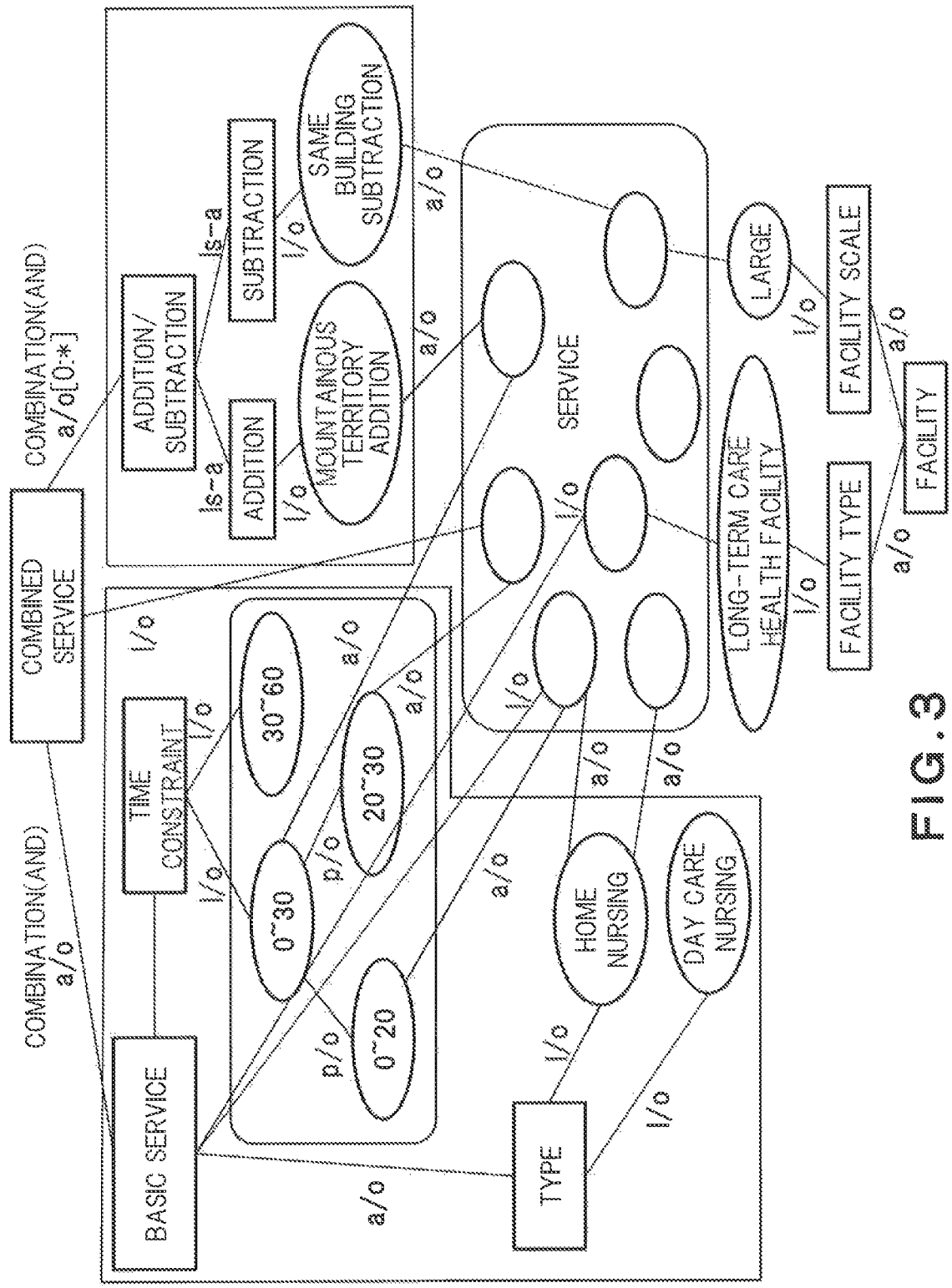
FIG. 3 is a diagram illustrating an example of combining variables in a condition of "and"

For example, examples of a combined service in the concept hierarchy according to ontology of FIG. 2 include a basic service and addition/subtraction. The basic service and the addition/subtraction are attributes (a/o) of the combined service. Therefore, as illustrated in FIG. 3, the basic service and the addition/subtraction may be combined together in a condition of "and". In the present embodiment, combination in a condition of "and" is referred to as creation.

In addition, in FIG. 2, time constraint is "a/o" of the basic service. "0 to 30" and "30 to 60" representing time are "I/o" of the time constraint. "0 to 20" and "20 to 30" are p/o of "0 to 30". Therefore, "0 to 20" and "20 to 30" may be combined together in a condition of "or". In the present embodiment, combination in a condition of "or" is referred to as integration. When "0 to 20" and "20 to 30" are combined together in the condition of "or", "0 to 20" and "20 to 30" may be integrated into "0 to 30" as illustrated in FIG. 4.

A type in FIG. 2 is "a/o" of the basic service. Home nursing and day care nursing are "I/o" of the type. Examples of "a/o" of home nursing include several services. However, any specific service is not specified in FIG. 2. Addition and subtraction are "is-a" of the addition/subtraction. Mountainous territory addition is "I/o" of the addition. Same building subtraction is "I/o" of the subtraction. Examples of "a/o" of the mountainous territory addition and the same building subtraction include specific services, respectively. A facility type and a facility scale are "a/o" of a facility. A long-term care health facility is "I/o" of the facility type. "Large" is "I/o" of the facility scale.

Note that FIG. 2 is an example of a concept hierarchy according to ontology related to a nursing service, and a concept hierarchy related to a nursing service is not restricted to FIG. 2.

Figure 5:
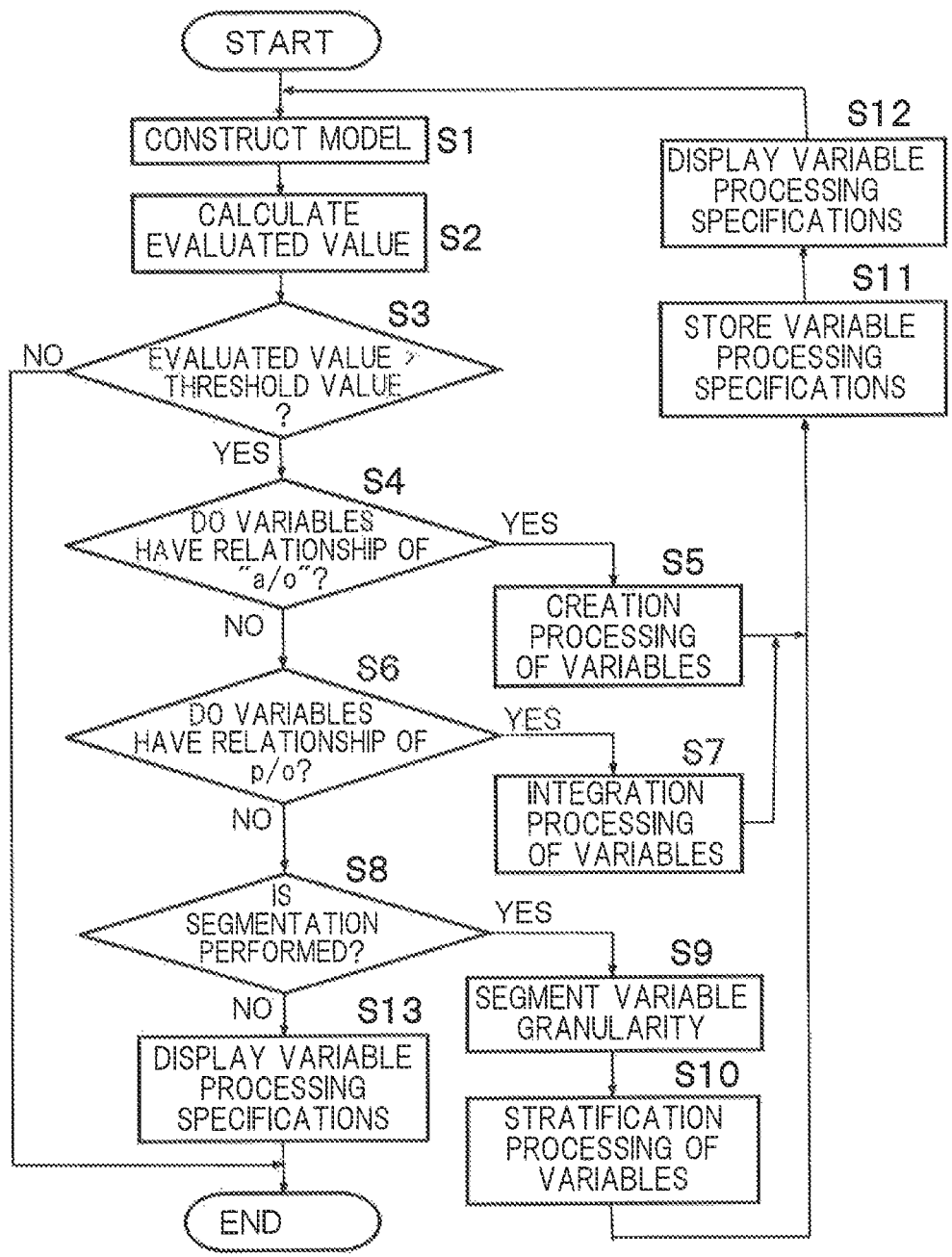
FIG. 5 is a flowchart illustrating an example of a procedure of the information processing apparatus 1 of FIG. 1.

FIG. 5 is a flowchart illustrating an example of a procedure of the information processing apparatus 1 of FIG. 1. First, a model is constructed by the model construction unit 2 (step S1). Herein, it is presumed that a model of a concept hierarchy according to ontology of FIG. 2 is constructed.

Subsequently, an evaluated value of the model constructed in step S1 is calculated by the evaluated value calculation unit 3. Herein, for example, a variance inflation factor (VIF) corresponding to an evaluation index of multicollinearity is calculated. The VIF is represented by Equation (1) below when a correlation coefficient ρ is used.

$$VIF = \frac{1}{1-\rho^2} \qquad (1)$$

Note that the evaluated value is not restricted to the VIF. For example, it is possible to use, as the evaluated value, a value P of a statistical test, the Akaike's Information Criterion (AIC) represented by a maximum likelihood and the number of free parameters, a residual of a least squares method, a coefficient of determination, and the like.

Subsequently, it is determined whether the evaluated value exceeds a threshold value (for example, 10). When the evaluated value is less than or equal to the threshold value, multicollinearity between a plurality of variables is considered to be solved, and thus processing of FIG. 2 is completed. On the other hand, when the evaluated value exceeds the threshold value, a strong correlation is considered to be present between a plurality of variables. Therefore, it is determined whether variables have a relationship of "a/o" of the same class, that is, whether one variable is an attribute of the other variable (step S4). When step S4 corresponds to YES, creation processing of the variables is performed (step S5). The creation processing refers to a process of multiplying the variables. A specific example of the creation process in the nursing service is a case in which a person to be cared simultaneously receives a plurality of types of nursing cares. For example, when the person to be cared simultaneously receives a nursing service of eating and a nursing service of bathing, a process of multiplying two variables with respect to these two services is performed in the creation processing.

When step S4 corresponds to NO, it is determined whether variables have a relationship of p/o, that is, whether one variable is a part of the other variable (step S6). When step S6 corresponds to YES, integration processing of the variables is performed (step S7). For example, when a variable representing 0 to 30 minutes, a variable representing 0 to 20 minutes, and a variable representing 20 to 30 minutes are present, a process of integrating the variable representing 0 to 20 minutes and the variable representing 20 to 30 minutes into the variable representing 0 to 30 minutes is performed in the integration processing.

When step S6 corresponds to NO, it is determined whether to segment variable granularity (step S8). Herein, whether to segment the variable granularity is determined with reference to the variable processing specifications input from the outside via the input unit 11.

When step S8 corresponds to YES, a process of segmenting the variable granularity is performed (step S9) to stratify the variables (step S10). A stratified variable is a variable having no relationship with another variable.

When processing of steps S5 and S7 or S10 is completed, the variable processing specifications are stored in the variable processing specification storage unit 12. Subsequently, the variable processing specifications are displayed (step S10). For example, the variable processing specifications are displayed by the model display unit 14. Thereafter, returning to step S1, a model is reconstructed, and processing after step S2 is repeated. The processing after step S2 is repeated until an evaluated value is determined to be less than or equal to the threshold value in step S3, or segmentation is determined not to be performed in step S8.

In the flowchart of FIG. 5, after whether to perform creation processing of variables is determined, whether to perform integration processing of variables is determined, and then whether to perform stratification processing of variables is determined. However, this processing order is arbitrary, and these processes may be performed in parallel.

A relationship between at least some variables within the concept hierarchy according to ontology of FIG. 2 may be represented by an equation of a regression model shown in the following Equation (2).

$$y = \beta_0 + \sum_i \beta_i x_i \quad (2)$$

y denotes an objective variable, and $x_i$ denotes a variable (explanatory variable). $\beta_i$ is a coefficient of the variable $x_i$, and $\beta_0$ is a constant term. Construction of a model indicates determination of a variable $x_i$, a coefficient, and a constant. In an example of FIG. 5, for example, an objective variable y is the number of times of receiving a home nursing service, and x is an attribute and an attribute value of a home nursing service.

Figure 6:
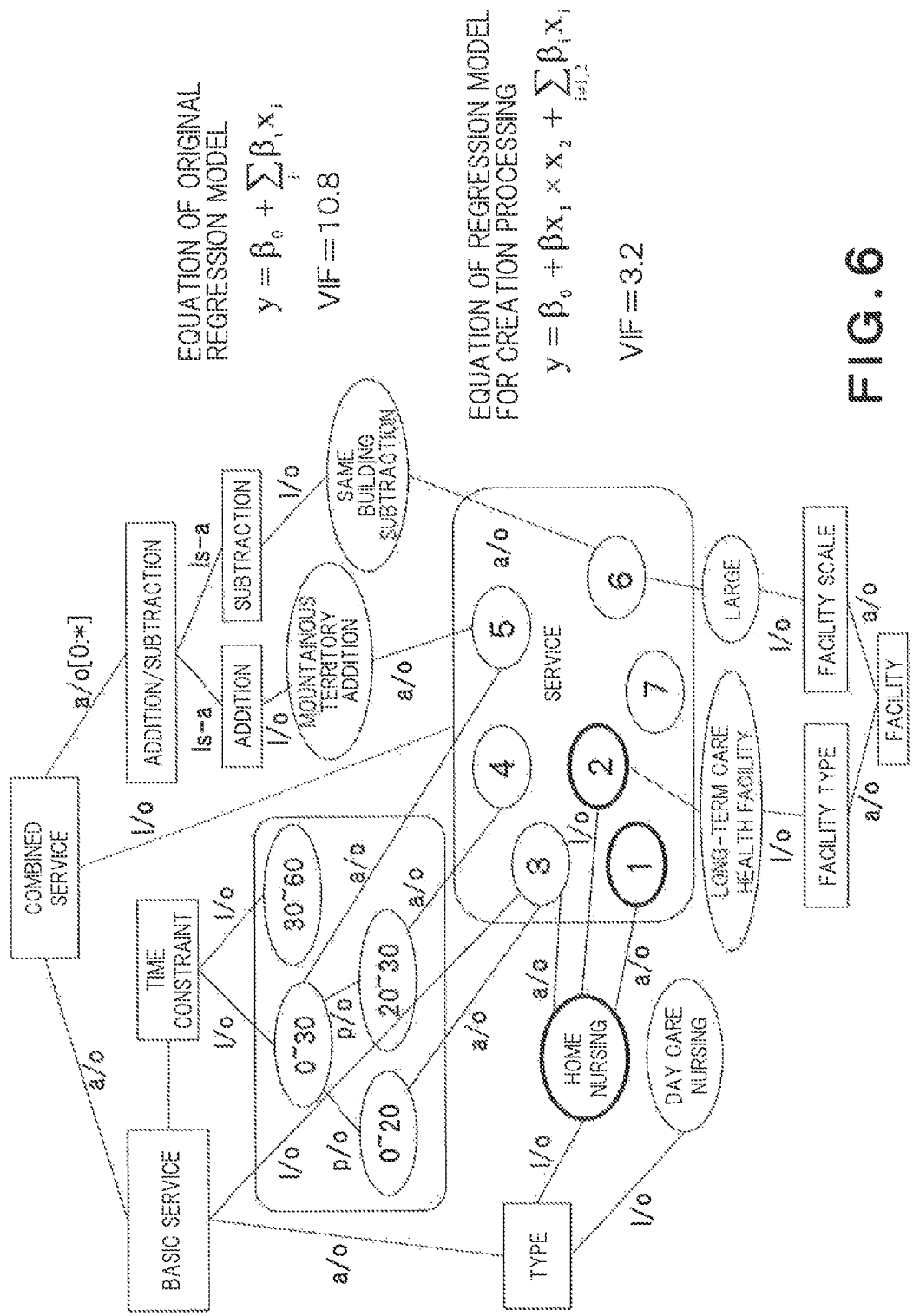
FIG. 6 is a diagram illustrating a display example and an equation of a regression model when creation processing of variables is performed.
Figure 7:
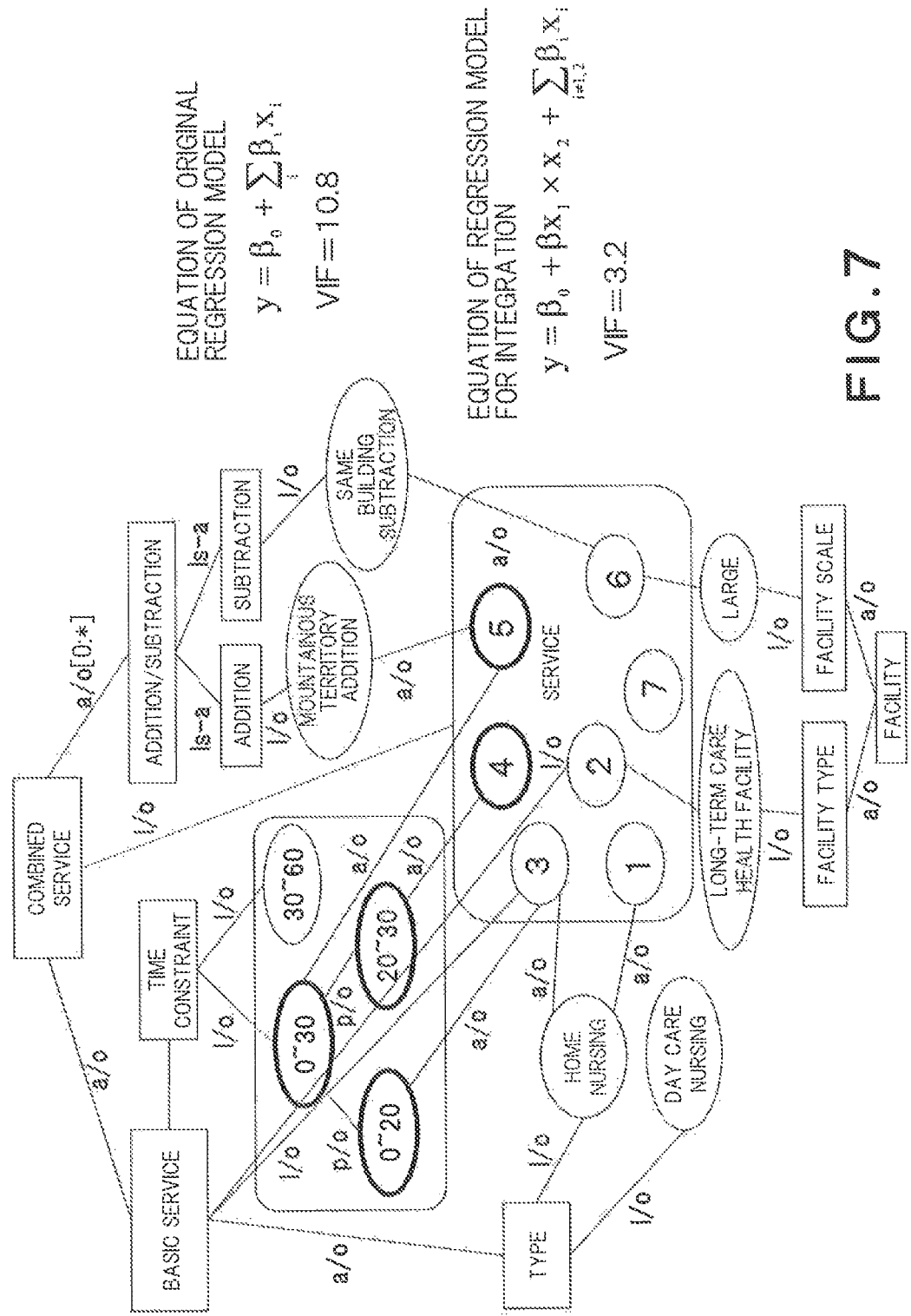
FIG. 7 is a diagram illustrating a display example and an equation of a regression model when integration processing of variables is performed.
Figure 8:
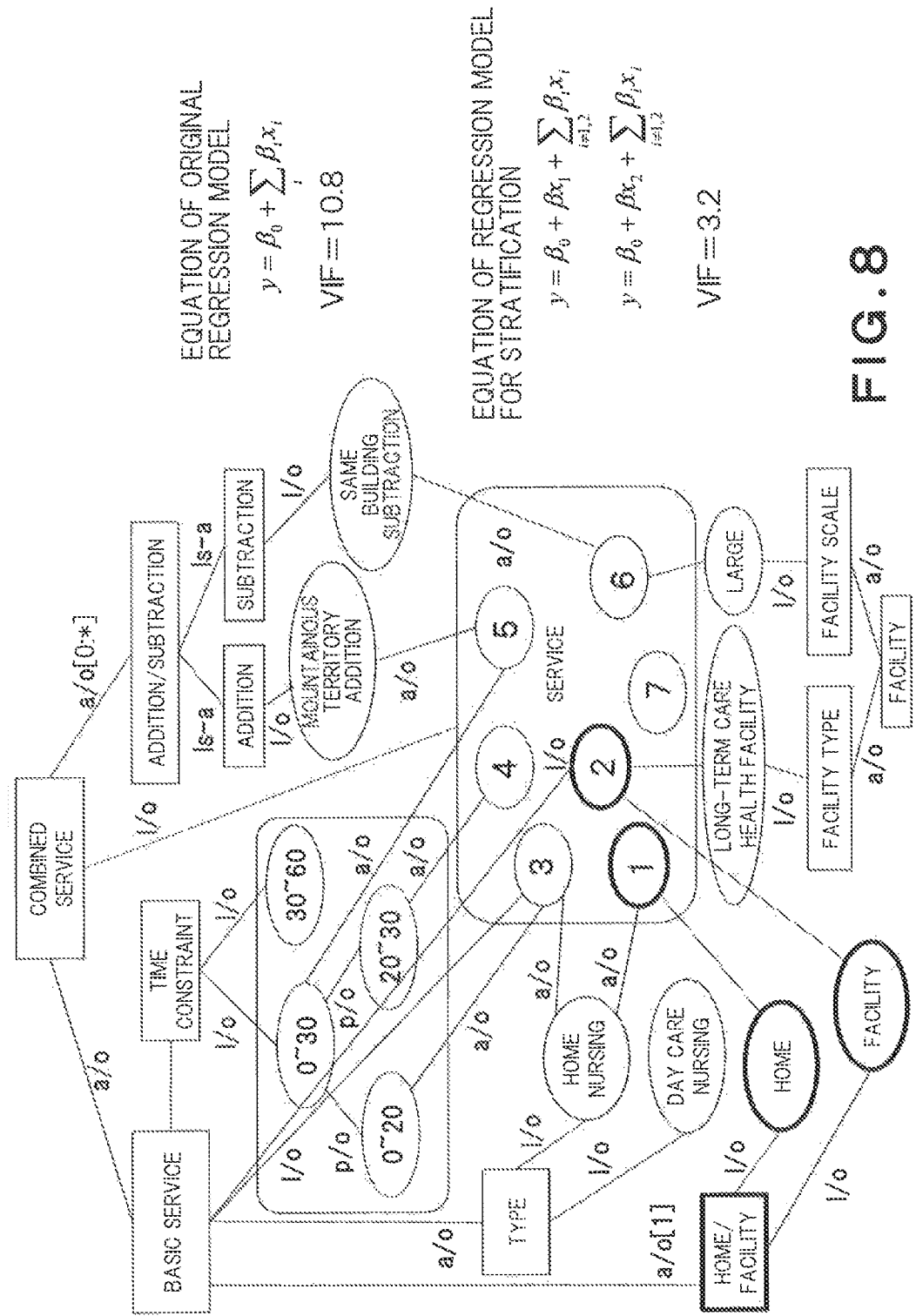
FIG. 8 is a diagram illustrating a display example and an equation of a regression model when stratification processing of variables is performed.

FIGS. 6 to 8 are diagrams illustrating examples of display by the model display unit 14 and examples of an equation of a regression model. FIG. 6 illustrates a display example and an equation of a regression model when creation processing of variables is performed, FIG. 7 illustrates a display example and an equation of a regression model when integration processing of variables is performed, and FIG. 8 illustrates a display example and an equation of a regression model when stratification processing of variables is performed.

A processing of multiplying a variable of service 1 and a variable of service 2 corresponding to attributes of a home nursing is performed in the creation processing of FIG. 6. In the display example of FIG. 6, a variable to be subjected to creation processing is displayed in a display form which is distinguishable from another variable by displaying the variable in bold type. The equation of the regression model of the case of FIG. 6 is represented by the following Equation (3).

$$y = \beta_0 + \beta x_1 \times x_2 + \sum_{i \neq 1,2} \beta_i x_i \quad (3)$$

As shown in Equation (3), creation (combination) of variables $x_1$ and $x_2$ is performed by multiplying the variables $x_1$ and $x_2$. According to verification of the present inventor, while a VIF is 10.8 before creation processing of variables is performed in the concept hierarchy according to ontology of FIG. 2, the VIF could be decreased up to 3.2 by performing the above-described creation processing of variables.

A process of integrating a variable of service 4 and a variable of service 5 corresponding to attributes of a nursing care time is performed in the integration processing of FIG. 7. In the display example of FIG. 7, a variable to be subjected to integration processing is displayed in a display form which is distinguishable from another variable by displaying the variable in bold type. The equation of the regression model of the case of FIG. 7 is represented by the following Equation (4).

$$y = \beta_0 + \beta(x_4 = x_5) + \sum_{i \neq 4,5} \beta_i x_i \quad (4)$$

As shown in Equation (4), integration processing of variables $x_4$ and $x_5$ is performed by integrating the variables $x_4$ and $x_5$ into one variable. According to verification of the present inventor, a VIF could be decreased up to 3.2 by performing the integration processing of variables in the concept hierarchy according to ontology of FIG. 2.

Figure 9:
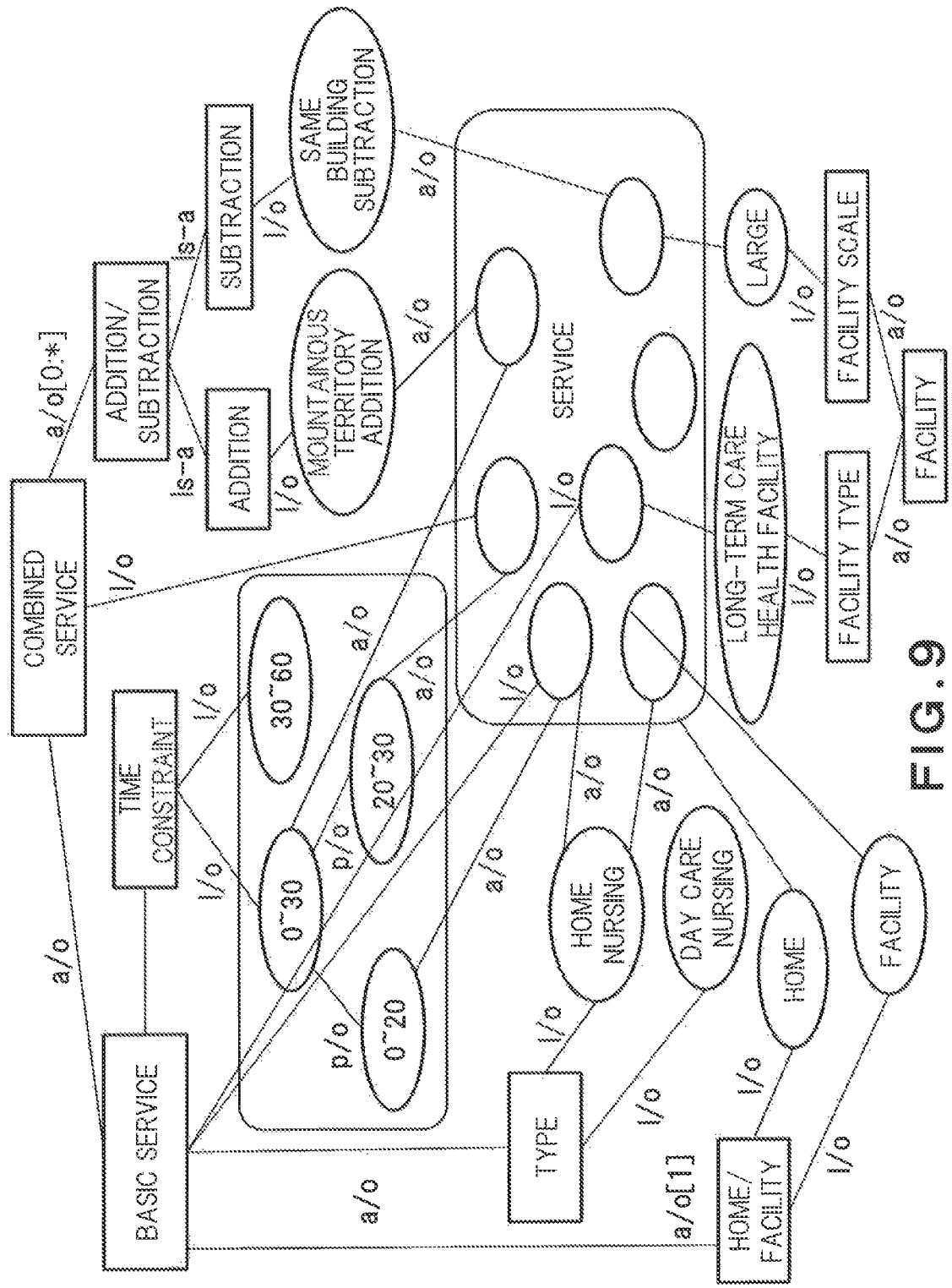
FIG. 9 is a diagram illustrating a structure of ontology data when stratification processing is performed.

Before describing the display example of the stratification processing of FIG. 8, a description will be given of a structure of a concept hierarchy when stratification processing is performed with respect to the concept hierarchy of ontology of FIG. 2 using FIG. 9. When compared to FIG. 2, home/facility corresponding to an attribute of a basic service, a home and a facility corresponding to attributes of the home/facility, service 1 corresponding to an attribute of the home, and service 2 corresponding to an attribute of the facility are additionally included in FIG. 9. Service 1 and service 2 are not connected to any other variables. Therefore, service 1 and service 2 may be stratified.

In the stratification processing of FIG. 8, an equation of a regression model is created for each of the stratified service 1 and service 2. Equation (5) below is an equation corresponding to service 1, and Equation (6) is an equation corresponding to service 2. According to verification of the present inventor, a VIF could be decreased up to 3.2 by performing the above-described stratification processing of variables.

$$y = \beta_0 + \beta x_1 + \sum_{i \neq 1,2} \beta_i x_i \quad (5)$$

$$y = \beta_0 + \beta x_2 + \sum_{i \neq 1,2} \beta_i x_i \quad (6)$$

Variable processing information which can be information for making a determination as to whether to perform creation processing, integration processing, or stratification processing of variables may be input to the information processing apparatus 1 from the outside via the input unit 11.

FIG. 10A and FIG. 10B are diagrams illustrating examples of the variable processing information. FIG. 10A illustrates an example of the variable processing information when variable A and variable B are adjacent to each other, and FIG. 10B illustrates an example of the variable processing information when variable A and variable B are not adjacent to each other. In the example of FIG. 10A, integration into variable B is performed when variable A is an instance ("I/o") of variable A. In addition, integration into variable A is performed when variable B is an attribute ("a/o") of variable A. In addition, integration into variable B is performed when variable B is "Has-a" of variable A. Similarly, integration into variable B is performed when variable B is a part (p/o) of variable A.

In the example of FIG. 10B, when variable C is an instance ("I/o") of variables A and B, and when variable C can take only one of variables A and B, stratification is performed. Otherwise, creation processing of variables A and B is performed. Creation processing of variables A and B is performed when variable C is an instance ("I/o") of variable A and is an attribute ("a/o") of variable B. Creation processing of variables A and B is performed when variable C is an attribute ("a/o") of variables A and B. Variables A and B are integrated when variable C is a part of variables A and B. Variables A and B are stratified when a link between variables A and B is not present.

FIG. 10A and FIG. 10B are not merely the examples of the variable processing information, and may be arbitrarily changed. It is possible to perform creation processing, integration processing, and stratification processing of optimum variables for an individual concept hierarchy by changing the variable processing information provided to the information processing apparatus 1 from the outside in accordance with the concept hierarchy.

As described above, in the present embodiment, after constructing a model represented using a plurality of variables corresponding to a plurality of classes based on data of a concept network which defines the plurality of classes, attributes of the respective classes, and a relationship between the respective classes, an evaluated value of the model is calculated, and a correlation between the respective variables within the model is verified by the evaluated value. When the correlation between the variables is high, at least one of creation processing and integration processing of the variables is performed according to a relationship between the respective variables. Thereafter, stratification processing is performed as necessary. In this way, it is possible to solve a problem that a highly reliable statistical model cannot be constructed since stratification is minutely performed, and thus the number of samples decreases.

At least a part of the information processing apparatus 1 described in the above embodiment may be configured as hardware or configured as software. In the case of software, a program that implements at least a part of a function of the information processing apparatus 1 may be stored in a recording medium such as a flexible disk, or a CD-ROM, and the program may be read by a computer and executed. The recording medium is not restricted to a detachable medium such as a magnetic disk, or an optical disc, and may correspond to a fixed type recording medium such as a hard disk drive, or a memory.

In addition, the program that implements at least a part of the function of the information processing apparatus 1 may be distributed via a communication line (including radio communication) such as the Internet. Further, the program may be distributed by being stored in a recording medium or via a wire circuit or a radio link such as the Internet in an encoded, modulate or compressed state.

Some embodiments have been described. However, these embodiments are presented as examples, and are not intended to restrict the scope of the invention. For example, the embodiments are applicable to a case in which a binary value corresponding to an effective/ineffective cure resulting from a medication effect is output as in a logistic regression model used for evaluation of a medication effect of a medical service illustrated in Equation (7) below. In this case, p is a probability of being effective. The embodiments are applicable to a statistical/discriminant model using a plurality of variables, $$y = \log\left(\frac{p}{1-p}\right) = \beta_0 + \sum_i \beta_i x_i \quad (7)$$

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing apparatus comprising:
processing circuitry configured to:
construct a model represented using a plurality of variables corresponding to a plurality of classes based on data relating to the plurality of classes, attributes of the classes, and a relationship indicating relevance of the classes, each of the classes including relevant variables;
calculate an evaluated value of the constructed model;
specify a correlation between variables among the plurality of variables based on the calculated evaluated value;
determine whether to perform at least one of creation, integration, and stratification of at least two variables among the plurality of variables based on the specified correlation, wherein the creation includes combination of the at least two variables in a condition of "and", and the integration includes combination of the at least two variables in a condition of "or";
perform at least one of creation processing, integration processing, and stratification processing of the variables when the at least one of the creation, the integration, and the stratification of the variables is determined to be performed;
construct a new model after performing the at least one of the creation processing, the integration processing, and the stratification processing; and
display the constructed new model for a user.

2. The information processing apparatus according to claim 1, wherein the processing circuitry is further configured to:
determine whether to perform at least one of the creation and the integration of the at least two variables among the plurality of variables based on the specified correlation, and
determine whether to perform the stratification of the at least two variables among the plurality of variables,
wherein the creation processing of the variables is performed when the creation of the variables is determined to be performed, the integration processing of the variables is performed when the integration of the variables is determined, and the stratification processing of the variables is performed when the stratification of the variables is determined.

3. The information processing apparatus according to claim 1,
wherein an evaluated value of the constructed new model is recalculated, and
respective processes are repeated until the evaluated value of the calculated new model belongs to a predetermined range.

4. The information processing apparatus according to claim 1, wherein the creation processing is performed among the plurality of variables when the plurality of variables has attributes of a same class, and the integration processing is performed among the plurality of variables when the plurality of variables has an inclusion relation.

5. The information processing apparatus according to claim 1, wherein the processing circuitry is further configured to:
determine whether to segment variable granularity when the plurality of variables does not belong to a same class and does not have an inclusion relation, and
determine whether to stratify at least two variables after the variable granularity is segmented,
wherein stratification processing of the at least two variables is performed when the plurality of variables does not belong to the same class and does not have the inclusion relation, and when stratification is determined to be performed.

6. The information processing apparatus according to claim 1, wherein the constructed model is represented by an equation of a regression model that creates an output value by adding values obtained by multiplying the plurality of variables by coefficients corresponding to the variables.

7. The information processing apparatus according to claim 6, wherein a process of multiplying variables of two or more terms in the equation of the regression model is performed when performing the creation processing.

8. The information processing apparatus according to claim 6, wherein a process of integrating variables of two or more terms in the equation of the regression model into one variable is performed when performing the integration processing.

9. The information processing apparatus according to claim 6, wherein an equation of an individual regression model for each variable to be subjected to the stratification processing is created when performing the stratification processing.

10. The information processing apparatus according to claim 1, wherein the processing circuitry is further configured to:
input variable processing information related to the creation, the integration, and the stratification of the plurality of variables,
wherein the processing circuitry determines whether to perform the at least one of the creation processing, the integration processing, and the stratification processing based on the variable processing information.

11. The information processing apparatus according to claim 1,
wherein the calculated evaluated value is a value obtained by digitizing an accuracy of the model, and
a correlation between two variables is specified among the plurality of variables.

12. An information processing method performed by a processing circuitry, the method comprising:
constructing a model represented using a plurality of variables corresponding to a plurality of classes based on data of a concept network that, defines the plurality of classes, attributes of the classes, and a relationship indicating relevance of the classes, each of the classes including relevant variables;
calculating an evaluated value of the constructed model;
specifying a correlation between variables among the plurality of variables based on the calculated evaluated value;
determining, by a variable determination process, whether to perform at least one of creation, integration, and stratification of at least two variables among the plurality of variables based on the specified correlation, wherein the creation includes combination of the at least two variables in a condition of "and", and the integration includes combination of the at least two variables in a condition of "or";
performing, by a variable process, at least one of creation processing, integration processing, and stratification processing of variables when the at least one of the creation, the integration, and the stratification of the variables is determined to be performed;
constructing a new model after the at least one of the creation processing, the integration processing, and the stratification processing is performed; and
displaying the constructed new model for a user.

13. The information processing method according to claim 12,
 wherein the variable determination process comprises:
  determining, by a first determination process, whether to perform at least one of the creation and the integration of the at least two variables among the plurality of variables based on the specified correlation, and
  determining, by a second determination process, whether to perform the stratification of the at least two variables among the plurality of variables after the first determination process,
 wherein the variable process performs the creation processing of the variables when the creation of the variables is determined to be performed by the first determination process, performs the integration processing of the variables when the integration of the variables is determined to be performed by the first determination process, and performs the stratification processing of the variables when the stratification of the variables is determined to be performed by the second determination process.

14. The information processing method according to claim 12,
 wherein the calculating of the evaluated value calculates an evaluated value of the constructed new model, and
 the variable determination process and the variable process repeat respective processes until the evaluated value of the calculated new model belongs to a predetermined range.

15. The information processing method according to claim 12,
 wherein the variable process performs the creation processing among the plurality of variables when the plurality of variables has attributes of a same class, and performs the integration processing among the plurality of variables when the plurality of variables has an inclusion relation.

16. The information processing method according to claim 12,
 wherein the variable determination process comprises:
  determining whether to segment variable granularity when the plurality of variables does not belong to a same class and does not have an inclusion relation, and
  determining whether to stratify at least two variables after the variable granularity is segmented,
 wherein the variable process performs stratification processing of the at least two variables when the plurality of variables does not belong to the same class and does not have the inclusion relation, and when stratification is determined to be performed.

17. The information processing method according to claim 12,
 wherein the model is represented by an equation of a regression model that creates an output value by adding values obtained by multiplying the plurality of variables by coefficients corresponding to the variables.

18. The information processing method according to claim 17,
 wherein the variable process performs a process of multiplying variables of two or more terms in the equation of the regression model when performing the creation processing.

19. The information processing method according to claim 17,
 wherein the variable process performs a process of integrating variables of two or more terms in the equation of the regression model into one variable when performing the integration processing.

20. A non-transitory recording medium to store a program executed by a computer,
 the program comprising:
  constructing a model represented using a plurality of variables corresponding to a plurality of classes based on data of a concept network that defines the plurality of classes, attributes of the classes, and a relationship indicating relevance of the classes, each of the classes including relevant variables;
  calculating an evaluated value of the constructed model;
  specifying a correlation between variables among the plurality of variables based on the calculated evaluated value;
  determining, by a variable determination process, whether to perform at least one of creation, integration, and stratification of at least two variables among the plurality of variables based on the specified correlation, wherein the creation includes combination of the at least two variables in a condition of "and", and the integration includes combination of the at least two variables in a condition of "or";
  performing, by a variable process, at, least one of creation processing, integration processing, and stratification processing of variables when the at least one of the creation, the integration, and the stratification of the variables is determined to be performed;
  constructing a new model after the at least one of the creation processing, the integration processing, and the stratification processing is performed; and
  displaying the constructed new model for a user.

* * * * *